United States Patent
Abedini et al.

(10) Patent No.: US 12,144,043 B2
(45) Date of Patent: Nov. 12, 2024

(54) CONCURRENT COMMUNICATIONS IN A NETWORK

(71) Applicant: QUALCOMM Incorporated, San Diego, CA (US)

(72) Inventors: Navid Abedini, Somerset, NJ (US); Jianghong Luo, Skillman, NJ (US); Muhammad Nazmul Islam, Littleton, MA (US); Karl Georg Hampel, Hoboken, NJ (US); Junyi Li, Fairless Hills, PA (US); Juergen Cezanne, Ocean Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 149 days.

(21) Appl. No.: 17/304,894

(22) Filed: Jun. 28, 2021

(65) Prior Publication Data

US 2021/0392711 A1 Dec. 16, 2021

Related U.S. Application Data

(63) Continuation of application No. 16/256,577, filed on Jan. 24, 2019, now Pat. No. 11,051,349.
(Continued)

(51) Int. Cl.
*H04W 76/27* (2018.01)
*H04W 4/20* (2018.01)
(Continued)

(52) U.S. Cl.
CPC ............. *H04W 76/15* (2018.02); *H04W 4/20* (2013.01); *H04W 56/0015* (2013.01); *H04W 56/0045* (2013.01); *H04W 76/27* (2018.02)

(58) Field of Classification Search
CPC ........... H04W 72/0446; H04W 72/042; H04W 72/0453; H04W 72/0493; H04W 76/15;
(Continued)

(56) References Cited

U.S. PATENT DOCUMENTS 9,436,820 B1 9/2016 Gleichauf et al.
9,729,295 B2 * 8/2017 Zhang .................. H04L 1/1861
(Continued)

FOREIGN PATENT DOCUMENTS

CN 105229938 A 1/2016
EP 1933507 A1 6/2008
(Continued)

OTHER PUBLICATIONS

Taiwan Search Report—TW111123201—TIPO—Aug. 4, 2022.
(Continued)

*Primary Examiner* — Wei Zhao
(74) *Attorney, Agent, or Firm* — Guang Yu Zhang; Harrity & Harrity, LLP

(57) ABSTRACT

Various aspects of the present disclosure generally relate to wireless communication. In some aspects, a wireless node may determine a first communication configuration for another wireless node. The wireless node may determine a second communication configuration, for the other wireless node, that is different from the first communication configuration, wherein the first communication configuration is a first timing reference and the second communication configuration is a second timing reference that is different from the first timing reference. The wireless node may communicate, with the other wireless node on a downlink, on an uplink, or on a sidelink, using the first communication configuration and the second communication configuration. Numerous other aspects are provided.

30 Claims, 15 Drawing Sheets

Related U.S. Application Data

(60) Provisional application No. 62/669,878, filed on May 10, 2018.

(51) Int. Cl.
  *H04W 56/00* (2009.01)
  *H04W 76/15* (2018.01)

(58) Field of Classification Search
  CPC ............. H04W 76/27; H04W 56/0045; H04W 56/0015; H04W 4/20; H04W 84/22; H04W 84/045
  See application file for complete search history.

(56) References Cited

U.S. PATENT DOCUMENTS

| | | | |
|---|---|---|---|
| 10,749,652 | B2 | 8/2020 | Chen et al. |
| 11,051,349 | B2 | 6/2021 | Abedini et al. |
| 2009/0081962 | A1 | 3/2009 | Sohrabi |
| 2011/0244800 | A1* | 10/2011 | Bogestam ............. H04L 67/306 455/41.2 |
| 2012/0213196 | A1* | 8/2012 | Chung ................... H04L 5/0007 370/336 |
| 2015/0304868 | A1 | 10/2015 | Yu et al. |
| 2016/0143044 | A1 | 5/2016 | Suzuki et al. |
| 2017/0005913 | A1 | 1/2017 | Hampel et al. |
| 2017/0055130 | A1 | 2/2017 | LeBlanc et al. |
| 2017/0332371 | A1 | 11/2017 | Kubota et al. |
| 2017/0367046 | A1* | 12/2017 | Papasakellariou ........................... H04W 52/0216 |
| 2017/0373740 | A1 | 12/2017 | Guo et al. |
| 2018/0278437 | A1 | 9/2018 | Davydov |
| 2019/0173642 | A1 | 6/2019 | Zhang et al. |
| 2021/0036765 | A1* | 2/2021 | Keskitalo .......... H04W 72/0446 |
| 2022/0407668 | A1* | 12/2022 | Zhang .................. H04W 72/23 |

FOREIGN PATENT DOCUMENTS

| | | |
|---|---|---|
| WO | 2014168846 A1 | 10/2014 |
| WO | 2016158866 A1 | 10/2016 |
| WO | 2017049532 A1 | 3/2017 |
| WO | 2018030812 A1 | 2/2018 |

OTHER PUBLICATIONS

International Search Report and Written Opinion—PCT/US2019/027154—ISA/EPO—Jul. 29, 2019.

European Search Report—EP23170321—Search Authority—The Hague—Aug. 3, 2023.

Huawei., et al., "Remaining Issues on Group-common PDCCH", 3GPP TSG RAN WG1 Meeting #92, R1-1801336, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018, 4 Pages, XP051397500, Sections 4.3 and 4.4.

Qualcomm Incorporated: "TP for 38.213 Section 11.1", 3GPP TSG RAN WG1 #92bis, R1-1805569, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 16, 2018, 10 Pages, XP051427571, Section 11.1.1.

Taiwan Search Report—TW111123201—TIPO—Sep. 1, 2023.

VIVO: "Discussion on NR TDD UL/DL Configurations and HPUE Behaviour", 3GPP TSG-RAN WG4 AdHoc 1801, R4-1800414, 3rd Generation Partnership Project, Mobile Competence Centre, 650, Route Des Lucioles, F-06921 Sophia-Antipo, vol. RAN WG4, No. San Diego, US, Jan. 22, 2018-Jan. 26, 2018, Jan. 15, 2018, 6 Pages, XP051388047, Section 2.3.

* cited by examiner

CONCURRENT COMMUNICATIONS IN A NETWORK

CROSS-REFERENCE TO RELATED APPLICATIONS UNDER 35 U.S.C. § 119

This application is a continuation of U.S. patent application Ser. No. 16/256,577, filed Jan. 24, 20219 (now U.S. Pat. No. 11,051,349), entitled "CONCURRENT COMMUNICATIONS IN A NETWORK," which claims priority to U.S. Provisional Patent Application No. 62/669,878, filed on May 10, 2018, entitled "TECHNIQUES AND APPARATUSES FOR CONCURRENT COMMUNICATIONS IN A NETWORK," the contents of which are incorporated herein by reference in their entireties.

FIELD OF THE DISCLOSURE

Aspects of the present disclosure generally relate to wireless communication, and more particularly to techniques and apparatuses for concurrent communications in a network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by wireless node, may include determining a first communication configuration for another wireless node. The method may include determining a second communication configuration, for the other wireless node, that is different from the first communication configuration, wherein the first communication configuration is a first timing reference and the second communication configuration is a second timing reference that is different from the first timing reference. The method may include communicating, with the other wireless node on a downlink, on an uplink, or on a sidelink, using the first communication configuration and the second communication configuration.

In some aspects, a wireless node for wireless communication may include memory and one or more processors operatively coupled to the memory. The memory and the one or more processors may be configured to determine a first communication configuration for another wireless node. The memory and the one or more processors may be configured to determine a second communication configuration, for the other wireless node, that is different from the first communication configuration, wherein the first communication configuration is a first timing reference and the second communication configuration is a second timing reference that is different from the first timing reference. The memory and the one or more processors may be configured to communicate, with the other wireless node on a downlink, on an uplink, or on a sidelink, using the first communication configuration and the second communication configuration.

In some aspects, a non-transitory computer-readable medium may store one or more instructions for wireless communication. The one or more instructions, when executed by one or more processors of a wireless node, may cause the one or more processors to determine a first communication configuration for another wireless node. The one or more instructions, when executed by the one or more processors of the wireless node, may cause the one or more processors to determine a second communication configuration, for the other wireless node, that is different from the first communication configuration, wherein the first communication configuration is a first timing reference and the second communication configuration is a second timing reference that is different from the first timing reference. The one or more instructions, when executed by the one or more processors of the wireless node, may cause the one or more processors to communicate, with the other wireless node on a downlink, on an uplink, or on a sidelink, using the first communication configuration and the second communication configuration.

In some aspects, an apparatus for wireless communication may include means for determining a first communication configuration for a wireless node. The apparatus may include means for determining a second communication configuration, for the wireless node, that is different from the first communication configuration, wherein the first communication configuration is a first timing reference and the second communication configuration is a second timing reference that is different from the first timing reference. The apparatus may include means for communicating, with the wireless node on a downlink, on an uplink, or on a sidelink, using the first communication configuration and the second communication configuration.

In some aspects, a method of wireless communication, performed by a central unit, may include determining a first communication configuration based at least in part on a resource configuration. The method may include determining a second communication configuration that is different from the first communication configuration based at least in part on the resource configuration, wherein the first communication configuration is a first timing reference and the second communication configuration is a second timing reference that is different from the first timing reference. The method may include communicating, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration.

In some aspects, a central unit for wireless communication may include memory and one or more processors operatively coupled to the memory. The memory and the one or more processors may be configured to determine a first communication configuration based at least in part on a resource configuration. The memory and the one or more processors may be configured to determine a second communication configuration that is different from the first communication configuration based at least in part on the resource configuration, wherein the first communication configuration is a first timing reference and the second communication configuration is a second timing reference that is different from the first timing reference. The memory and the one or more processors may be configured to communicate, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration.

In some aspects, a non-transitory computer-readable medium may store one or more instructions for wireless communication. The one or more instructions, when executed by one or more processors of a central unit, may cause the one or more processors to determine a first communication configuration based at least in part on a resource configuration. The one or more instructions, when executed by the one or more processors of the central unit, may cause the one or more processors to determine a second communication configuration that is different from the first communication configuration based at least in part on the resource configuration, wherein the first communication configuration is a first timing reference and the second communication configuration is a second timing reference that is different from the first timing reference. The one or more instructions, when executed by the one or more processors of the central unit, may cause the one or more processors to communicate, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration.

In some aspects, an apparatus for wireless communication may include means for determining a first communication configuration based at least in part on a resource configuration. The apparatus may include means for determining a second communication configuration that is different from the first communication configuration based at least in part on the resource configuration, wherein the first communication configuration is a first timing reference and the second communication configuration is a second timing reference that is different from the first timing reference. The apparatus may include means for communicating, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration.

Aspects generally include a method, apparatus, system, computer program product, non-transitory computer-readable medium, user equipment, base station, wireless communication device, wireless node, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
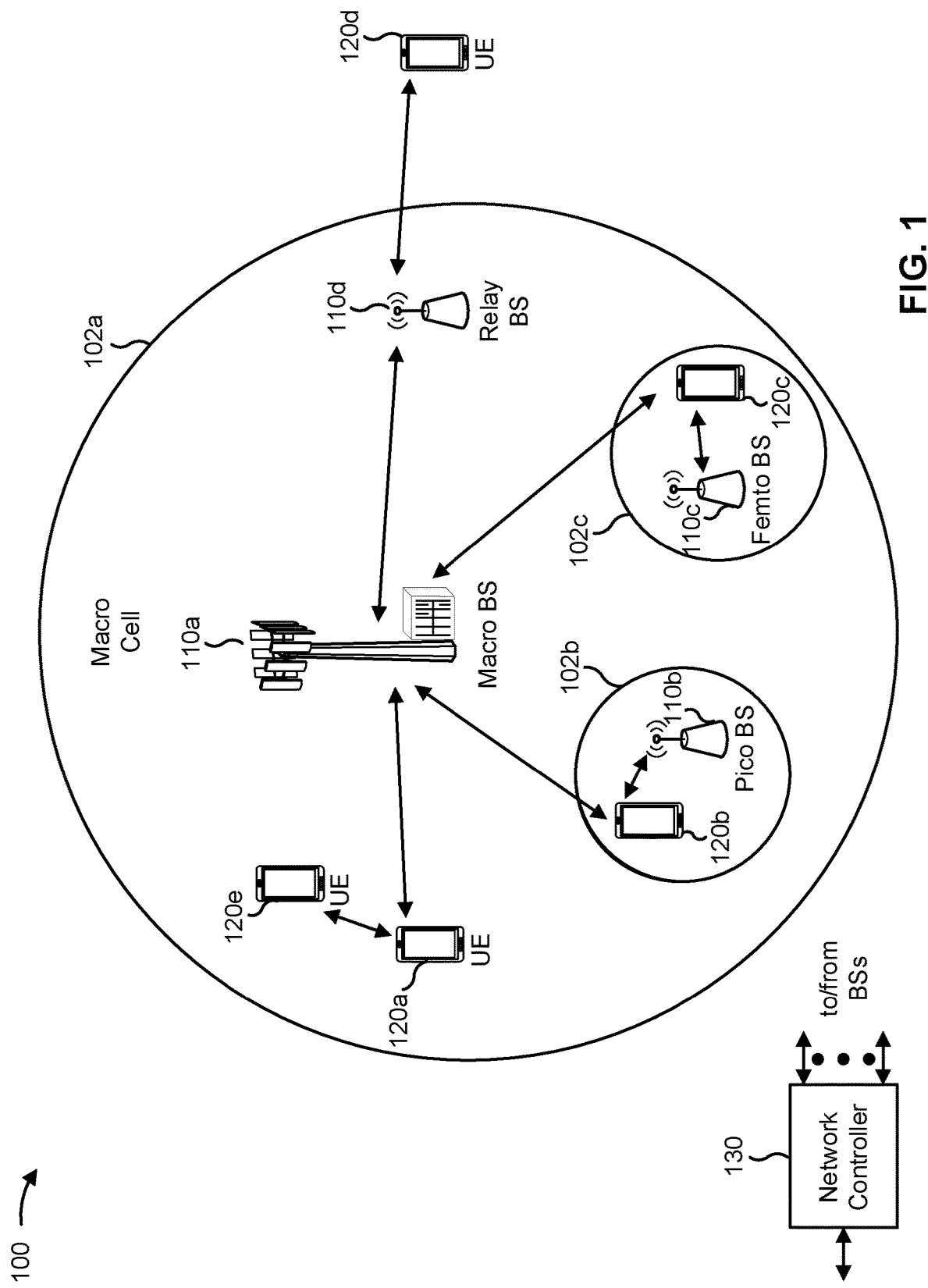
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
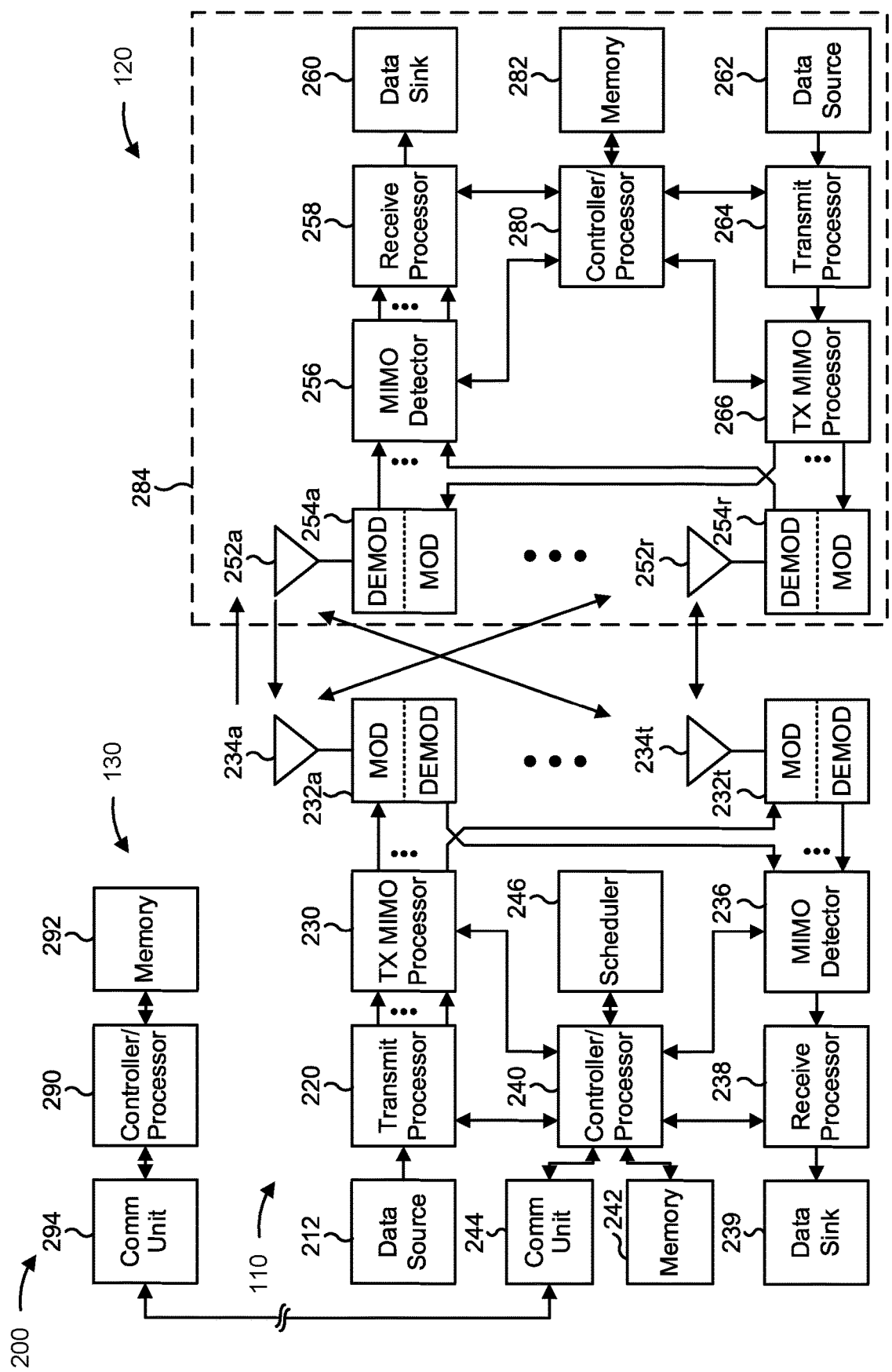
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with concurrent communications in a multi-hop network, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, a wireless node, such as a BS 110, a UE 120, and/or the like, may include means for determining a first communication configuration for another wireless node (e.g., another BS 110, another UE 120, and/or the like); means for determining a second communication configuration, for the other wireless node, that is different from the first communication configuration; means for communicating, with the other wireless node on a downlink, on an uplink, or on a sidelink, using the first communication configuration and the second communication configuration; and/or the like. In some aspects, such means may include one or more components of BS 110 and/or UE 120 described in connection with FIG. 2.

As indicated above, FIG. 2 is provided merely as an example. Other examples may differ from what is described with regard to FIG. 2.

Figure 3A:
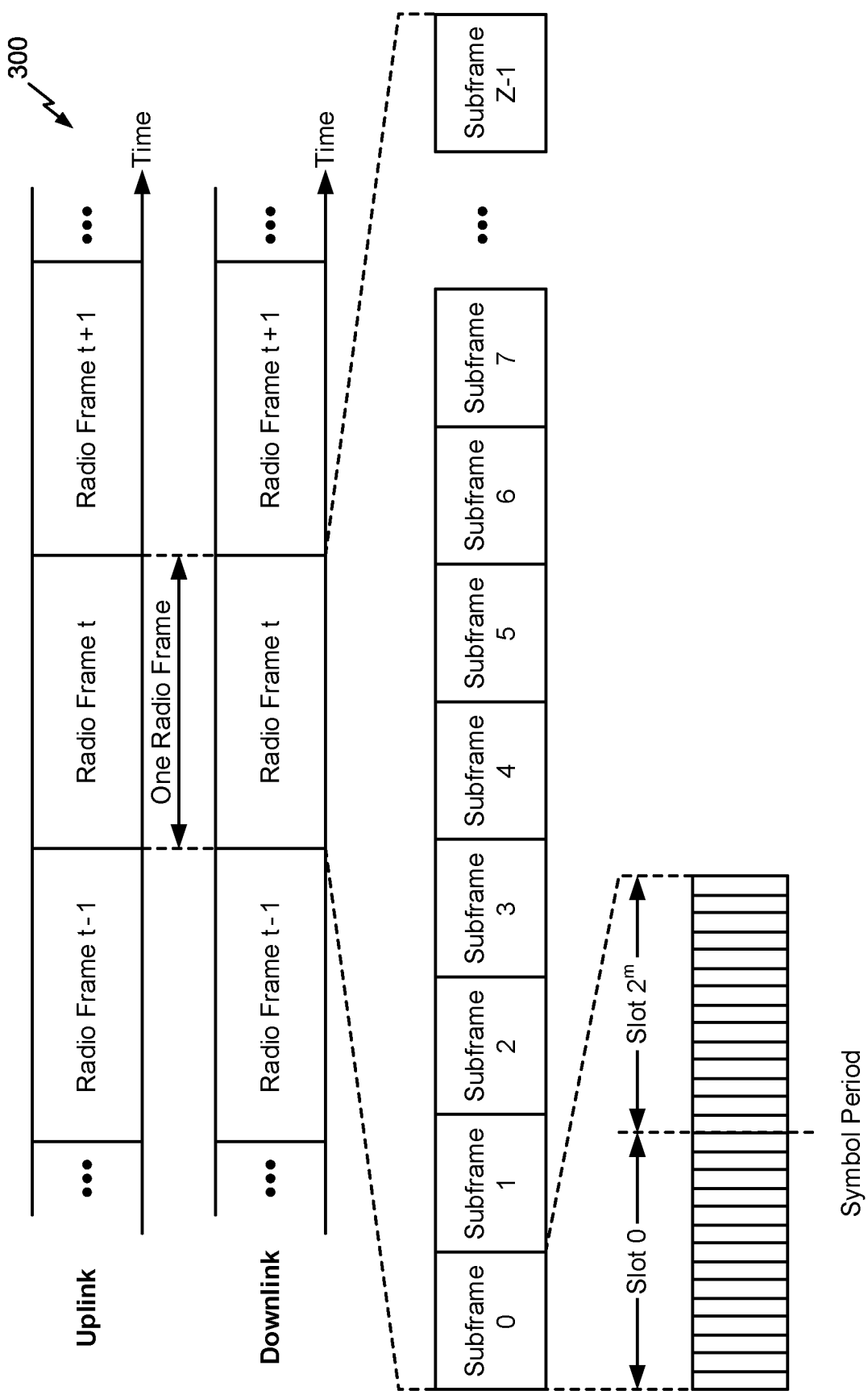
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
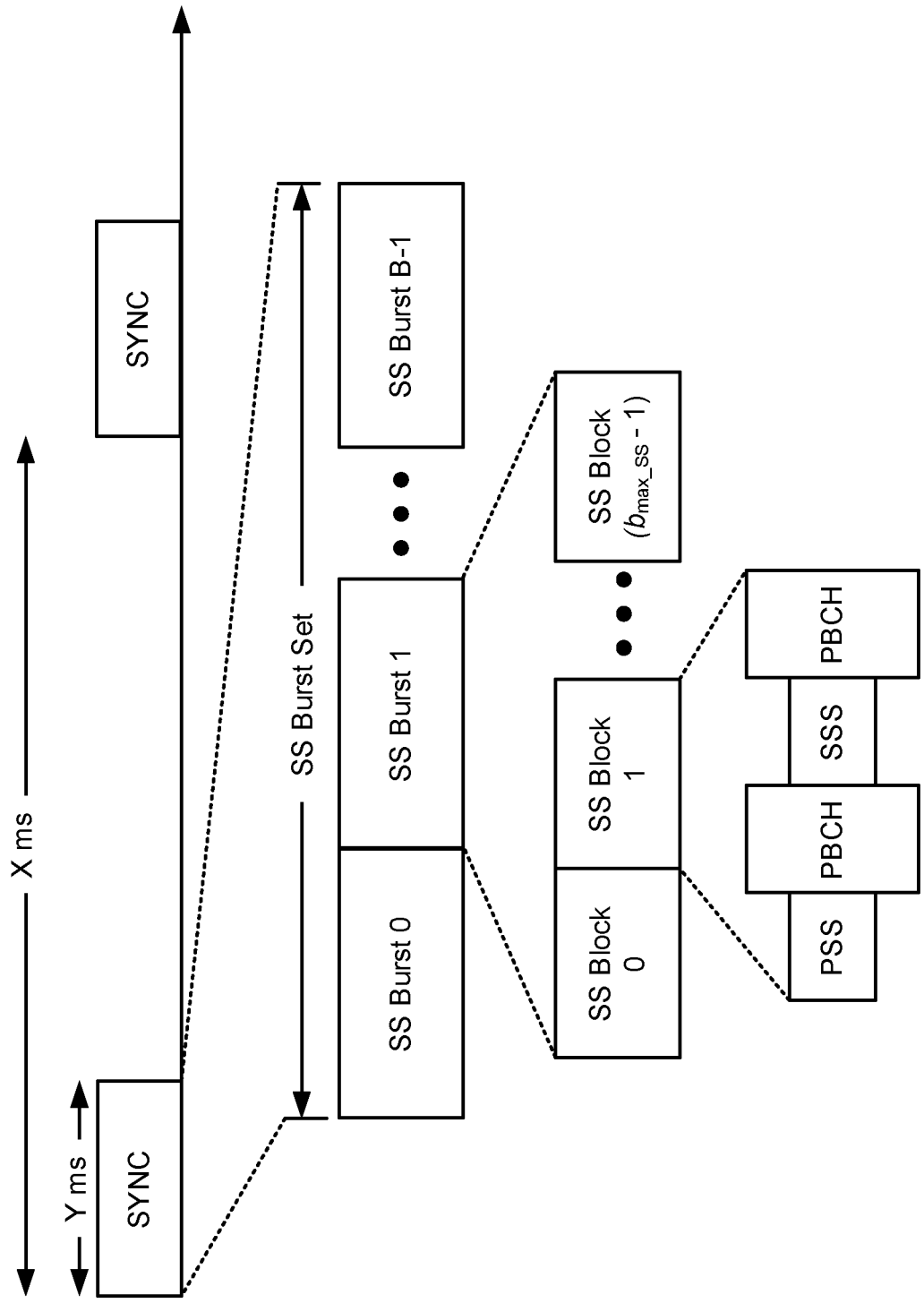
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some communications systems, such as 5G or NR, a multi-hop network may be deployed to enable communication between wireless nodes of the network. The wireless nodes may be associated with a timing scheme that enables alignment of communications between wireless nodes associated with different links. For example, a timing reference may be used to identify a set of communication opportunities, such as a set of slots allocated for a set of channels. To enable flexibility in communication, timing advance groups may be deployed to enable different timing references for different links to different wireless nodes.

With regard to timing advance groups, a wireless node (e.g., a UE) may have a first timing reference for communicating with a first cell and may have a second timing reference for communicating with a second cell. In this case, the wireless node may determine multiple downlink timing references for downlink communications and may determine multiple offset values for corresponding uplink communications. In some cases, the wireless node may receive a timing adjustment command for a downlink communication that may cause an adjustment to a timing for the downlink communication, and the UE may propagate the timing adjustment to one or more other wireless nodes. However, use of timing advance groups and downlink timing adjustments may limit flexibility to timing adjustments for communications by a wireless node to different other wireless nodes.

Some implementations, described herein, may enable concurrent communications in a network. For example, for uplink communications and downlink communications by a wireless node with another wireless node, the wireless node may determine multiple different communication configurations. In this case, the wireless node may determine a first timing reference for a communication with the other wireless node and a second, different timing reference for another communication with the same other wireless node, thereby enabling flexibility for multiplexed communications. In this way, the wireless node may improve network performance by enabling more flexible utilization of resources relative to using a single timing reference for all communications on a single link to another wireless node.

Moreover, some implementations, described herein, may enable configuration of a cyclic prefix size, a subcarrier spacing configuration, and/or the like on a resource-specific basis, thereby improving flexibility in utilization of a network and reducing a likelihood of or an impact of a time misalignment. Furthermore, some implementations, described herein, may utilize different slot formats to improve flexibility in utilization of a network and to reduce a likelihood of or an impact of a time misalignment.

Figure 4A:
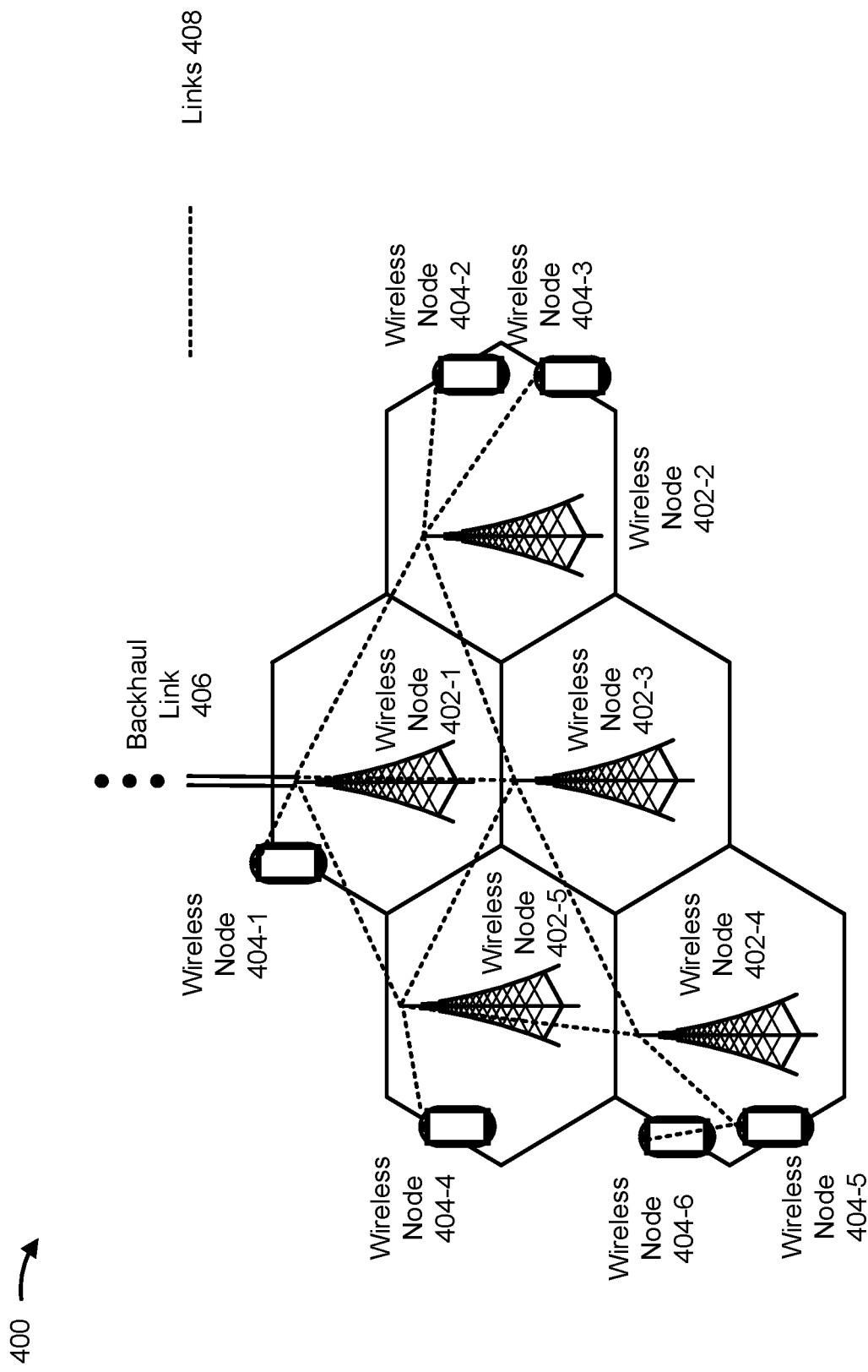
FIGS. 4A and 4B are diagrams illustrating an example of a network topology for a network, in accordance with various aspects of the present disclosure.
Figure 4B:
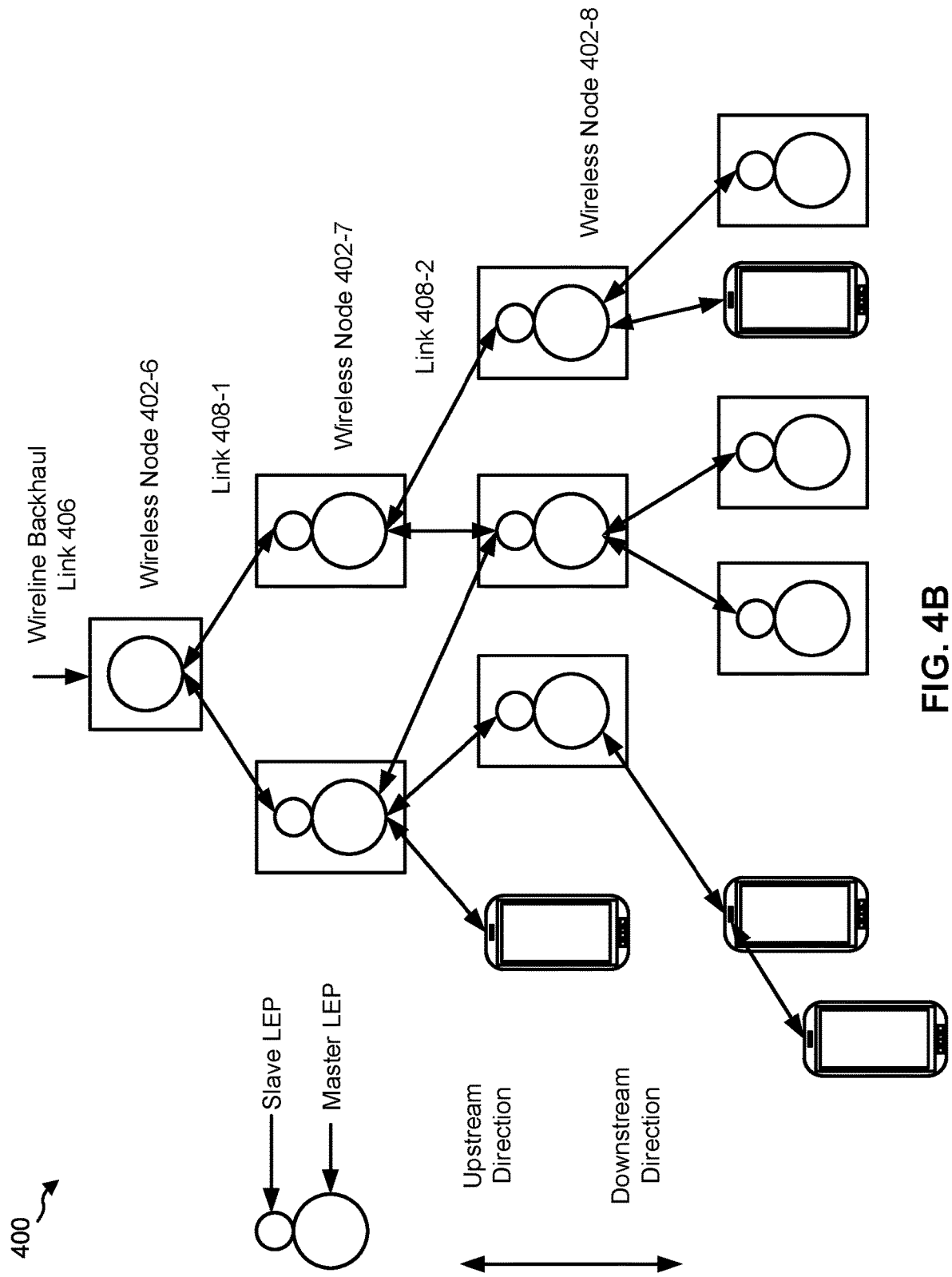

FIGS. 4A and 4B are diagrams illustrating an example 400 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., a BS 110, a UE 120, and/or the like) may communicate backhaul traffic via first mmWave resources with a second wireless node, and may communicate access traffic via second mmWave resources with a third wireless node. In some aspects, the second wireless node and the third wireless node may be the same wireless node. For example, the first wireless node may communicate traffic via first mmWave resources and second mmWave resources. Although some aspects, described herein, are described in terms of an IAB deployment, some aspects described herein may be used in connection with other types of multi-hop networks.

As shown in FIG. 4A, example 400 may include multiple wireless nodes 402 (e.g., BSs) and multiple wireless nodes 404 (e.g., UEs). At least one wireless node (e.g., wireless node 402-1) may communicate with a core network via a backhaul link 406, such as a fiber connection, a wireless backhaul connection, and/or the like. Wireless nodes 402 and 404 may communicate with each other using a set of links 408, such as a set of mmWave links; a 3G, 4G, 5G, etc. air interface; and/or the like. In some aspects, a wireless node 402 may correspond to BS 110 or UE 120 shown in FIG. 1. Similarly, a wireless node 404 may correspond to BS 110 or a UE 120 shown in FIG. 1.

As further shown in FIG. 4A, one or more wireless nodes 402 or 404 may communicate indirectly via one or more other wireless nodes 402 or 404. For example, data may be transferred from a core network to wireless node 404-6 via backhaul link 406, a link 408 between wireless node 402-1 and wireless node 402-5, a link 408 between wireless node 402-5 and wireless node 402-4, a link 408 between wireless node 402-4 and wireless node 404-5, and a link 408 between wireless node 404-5 and wireless node 404-6. In some aspects, multiple different paths may be used to communicate data between wireless nodes 402 or 404. For example, wireless node 402-5 may communicate with wireless node 402-4 via a single link 408 between wireless node 402-5 and wireless node 402-4 (e.g., a direct link) and/or via a first link 408 between wireless node 402-5 and wireless node 402-3 and a second link between wireless node 402-3 and wireless node 402-4 (e.g., an indirect link).

As shown in FIG. 4B, wireless nodes 402 and wireless nodes 404 can be arranged in a hierarchical topology to enable management of network resources. Each link 408 may be associated with a master link end point (master LEP) and a slave link end point (slave LEP), which may define a hierarchy between wireless nodes 402 or 404. For example, wireless node 402-6 may communicate with wireless node 402-7 via link 408-1. In this case, wireless node 402-6 is associated with a master link end point and wireless node 402-7 is associated with a slave link end point for link 408-1, which may define wireless node 402-6 as hierarchically superior to wireless node 402-7, and wireless node 402-7 as hierarchically inferior to wireless node 402-6 with regard to link 408-1. Moreover, wireless node 402-6 may be defined as upstream relative to wireless node 402-7 (and wireless node 402-7 may be defined as downstream relative to wireless node 402-6).

Similarly, wireless node 402-7 includes a master link end point for link 408-2 and wireless node 402-8 includes a slave link end point for backhaul link 408-2. In this case, wireless node 402-7 is hierarchically superior and upstream to wireless node 402-8, and wireless node 402-8 is hierarchically inferior and downstream to wireless node 402-7 with regard to link 408-2. In some aspects, a wireless node 402 or 404 may include a single antenna or antenna array for both the slave link end point and master link end point. In some aspects, a wireless node 402 or 404 may include a first antenna or antenna array for the slave link end point and a second antenna or antenna array for the master link end point.

As indicated above, FIGS. 4A and 4B are provided as examples. Other examples may differ from what is described with respect to FIGS. 4A and 4B.

Figure 5:
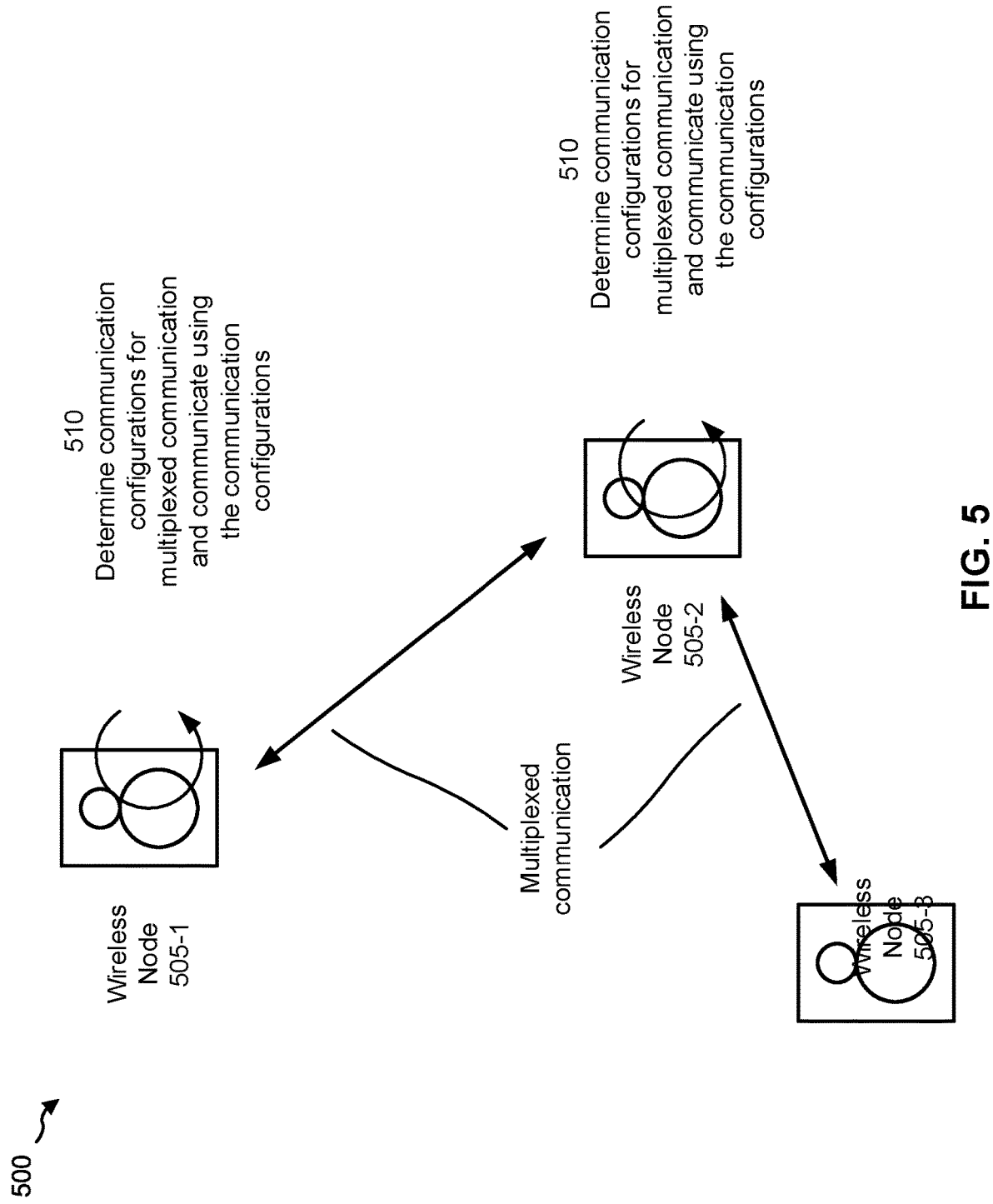
FIG. 5 is a diagram illustrating an example of concurrent communications in a multi-hop network, in accordance with various aspects of the present disclosure.

FIG. 5 is a diagram illustrating an example 500 of concurrent communications in a multi-hop network, in accordance with various aspects of the present disclosure. As shown in FIG. 5, example 500 may include a first wireless node 505-1, a second wireless node 505-2, and a third wireless node 505-3 communicating in a multi-hop network.

As further shown in FIG. 5, and by reference number 510, wireless node 505-1 and wireless node 505-2 may determine communication configurations (e.g., a first communication configuration and a second, different communication configuration) for multiplexed communication and may communicate using the communication configurations. For example, wireless node 505-1 and wireless node 505-2 may determine a first timing reference for a first transmission and a second timing reference, which is different from the first timing reference, for a second transmission. In this case, the first transmission and/or the second transmission may be an uplink transmission (e.g., upstream from wireless node 505-2 to wireless node 505-1) or a downlink transmission (e.g., downstream from wireless node 505-1 to wireless node 505-2, from wireless node 505-2 to wireless node 505-3, from wireless node 505-1 to wireless node 505-3 via wireless node 505-2, and/or the like).

In some aspects, the first transmission and the second transmission (and/or one or more other transmissions, such as between wireless node 505-1 and wireless node 505-3) may be multiplexed using space division multiplexing, frequency division multiplexing, code division multiplexing, time division multiplexing, and/or the like. For example, wireless node 505-2 may use a first timing reference for communicating with only wireless node 505-1 and a second timing reference for communicating with both wireless node 505-1 on a first link and wireless node 505-3 on a second link in frequency division multiplexing. In this case, communications on the first link and the second link are multiplexed and the second timing reference is used when concurrent communications are performed on the first link and the second link.

In some aspects, the communication configurations may be dynamically indicated. For example, wireless node 505-1 may transmit a downlink control information message to wireless node 505-2 indicating an offset of the second timing reference relative to the first timing reference. Additionally, or alternatively, wireless node 505-1 may provide an indication of an index value (e.g., in a pre-configured table stored by wireless node 505-2) that identifies the second timing reference, the offset of the second timing reference relative to the first timing reference, and/or the like.

In some aspects, the communication configurations may be semi-statically configured. For example, wireless node 505-1 and/or wireless node 505-2 may transmit one or more media access control messages, one or more radio resource control messages, and/or the like to configure a first timing reference and a second timing reference. In some aspects, wireless node 505-1 and/or wireless node 505-2 may configure the timing references on a resource-specific basis. For example, wireless node 505-1 may determine that a first slot associated with a first link may be associated with a first timing reference and a second slot associated with a second link may be associated with a second timing reference.

Additionally, or alternatively, the timing references may be configured on a signal specific basis, a channel specific basis, a channel type basis, and/or the like. For example, wireless node 505-1 may configure a first timing reference for broadcast channels, a second timing reference for control channels, a third timing reference for data channels, a fourth timing reference for reference signal transmissions, and/or the like. As another example, wireless node 505-1 may configure a first timing reference for a downlink control channel (e.g., a PDCCH) and a second timing reference for a downlink shared channel (e.g., a PDSCH).

In some aspects, the communication configurations may be signaled upstream. For example, wireless node 505-2 (e.g., which may be a UE or UE-function for wireless node 505-1) may determine a timing adjustment command, and may transmit the timing adjustment command upstream to wireless node 505-1 (e.g., which may be a BS or BS-function for wireless node 505-2) to configure the first timing reference and the second timing reference. In some aspects, the communication configuration may be determined based at least in part on a UE capability. For example, based at least in part on a capability of wireless node 505-2 (e.g., based at least in part on whether wireless node 505-2 supports dynamic adjustment of downlink transmission timing, uplink transmission timing, and/or the like; a latency requirement of wireless node 505-2; a maximum amount of adjustment between timing references that wireless node 505-2 can support for a set of resources; and/or the like), wireless node 505-2 may configure the first timing reference and the second timing reference.

In some aspects, wireless node 505-1 and/or wireless node 505-2 may configure another communication parameter to account for a timing misalignment. For example, wireless node 505-1 may configure a cyclic prefix size, a subcarrier spacing size, and/or the like. In this case, wireless node 505-1 may signal one or more cyclic prefix sizes, subcarrier spacing sizes, and/or the like using semi-static signaling, dynamic signaling, and/or the like. Additionally, or alternatively, wireless node 505-2 may signal the one or more cyclic prefix sizes, subcarrier spacing sizes, and/or the like upstream to wireless node 505-1. In some aspects, wireless node 505-2 may provide an indication of support for a communication configuration. For example, wireless node 505-2 may provide an indication of a set of supported cyclic prefixes, subcarrier spacings, modulation and coding schemes, frequency domain locations, and/or the like, and wireless node 505-1 may configure communication based at least in part on the indication.

In some aspects, wireless node 505-1 and/or wireless node 505-2 may use a particular type of slot format for communication. For example, wireless node 505-1 may use a slot format that includes a downlink symbol-flexible symbol-downlink symbol group within the slot (e.g., starting at symbol 0, symbol 1, symbol 2, . . . , symbol 13, and/or the like). Additionally, or alternatively, wireless node 505-1 may use a slot format that includes an uplink symbol-flexible symbol-uplink symbol group within the slot (e.g., starting at symbol 0, symbol 1, symbol 2, . . . , symbol 13, and/or the like). Additionally, or alternatively, wireless node 505-1 may use a slot format that includes an uplink symbol-flexible symbol-downlink symbol group within the slot (e.g., starting at symbol 0, symbol 1, symbol 2, . . . , symbol 13, and/or the like). In this way, wireless node 505-1 may use a slot format that supports dynamic configuration adjustment.

As indicated above, FIG. 5 is provided as an example. Other examples may differ from what is described with respect to FIG. 5.

Figure 6:
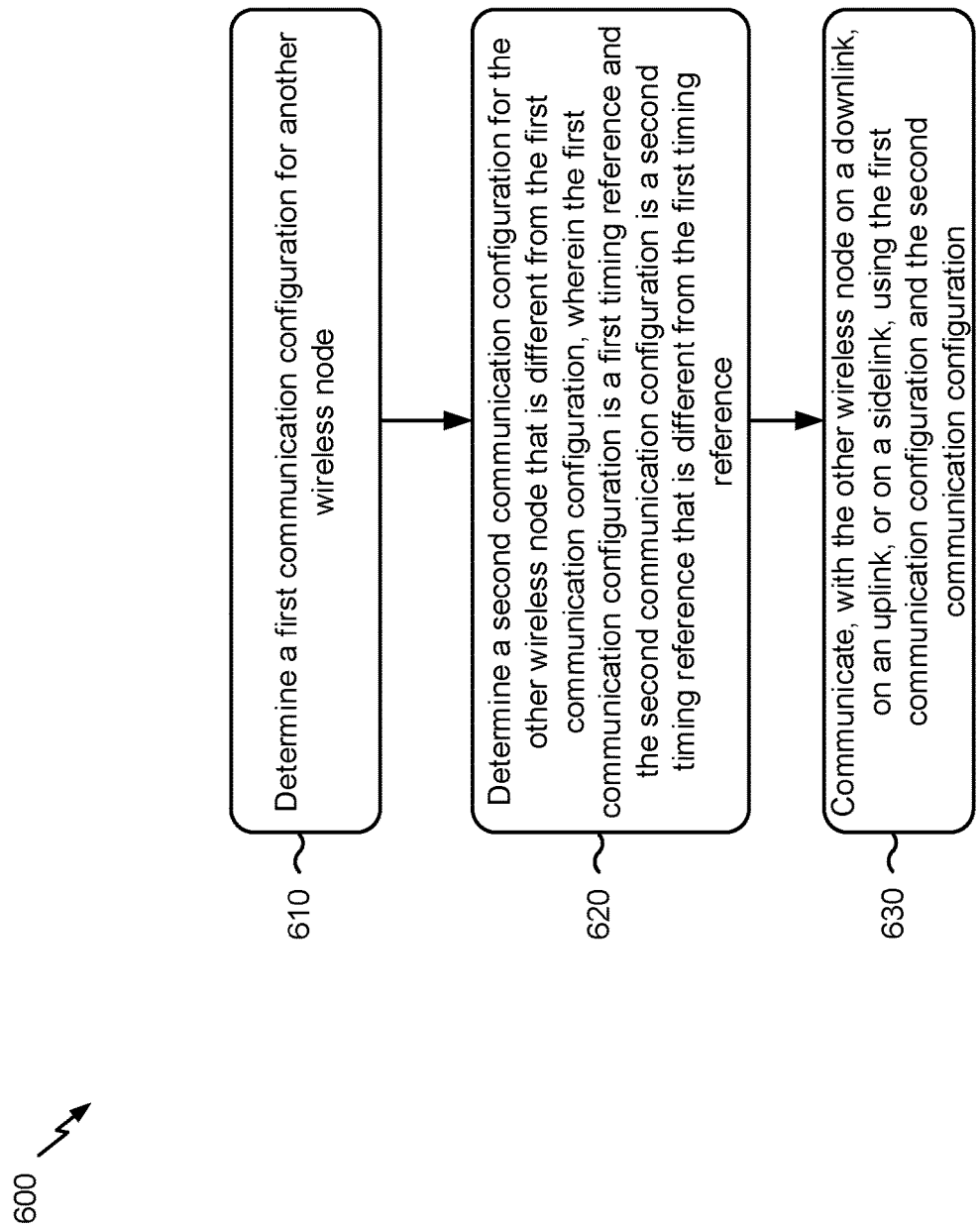
FIG. 6 is a diagram illustrating an example process performed, for example, by a wireless node, in accordance with various aspects of the present disclosure.

FIG. 6 is a diagram illustrating an example process 600 performed, for example, by a wireless node, in accordance with various aspects of the present disclosure. Example process 600 is an example where a wireless node (e.g., BS 110, UE 120, and/or the like) performs concurrent communication in a network.

As shown in FIG. 6, in some aspects, process 600 may include determining a first communication configuration for another wireless node, wherein the first communication configuration is a first timing reference and the second communication configuration is a second timing reference that is different from the first timing reference (block 610). For example, the wireless node (e.g., using controller/processor 240, controller/processor 280, and/or the like) may determine the first communication configuration for another wireless node, as described above. In some aspects, the first communication configuration is a first timing reference and the second communication configuration is a second timing reference that is different from the first timing reference.

As further shown in FIG. 6, in some aspects, process 600 may include determining a second communication configuration, for the other wireless node, that is different from the first communication configuration (block 620). For example, the wireless node (e.g., using controller/processor 240, controller/processor 280, and/or the like) may determine the second communication configuration, for the other wireless node, that is different from the first communication configuration, as described above.

As further shown in FIG. 6, in some aspects, process 600 may include communicating, with the other wireless node on a downlink, on an uplink, or on a sidelink, using the first communication configuration and the second communication configuration (block 630). For example, the wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate, with the other wireless node on the downlink or on the uplink, or on a sidelink, using the first communication configuration and the second communication configuration, as described above.

Process 600 may include additional aspects, such as any single aspect and/or any combination of aspects described below and/or in connection with one or more other processes described elsewhere herein.

In some aspects, the first communication configuration is a first set of timing references and the second communication configuration is a second timing reference that is different from the first set of timing references. In some aspects, the second timing reference is dynamically indicated based at least in part on a downlink control information message or a pre-configuration table index value indication message. In some aspects, the second timing reference is semi-statically configured based at least in part on a media access control message or a radio resource control message. In some aspects, the second timing reference is at least one of a resource-specific timing reference, a signal specific timing reference, or a channel specific timing reference.

In some aspects, the first set of timing references is associated with a first type of channel and the second timing reference is associated with a second type of channel. In some aspects, the second timing reference is configured based at least in part on a configuration message received from the other wireless node. In some aspects, the second timing reference is configured based at least in part on a timing adjustment command received from the other wireless node.

In some aspects, the second timing reference is configured based at least in part on a capability of one of the wireless node or the other wireless node. In some aspects, the capability is at least one of: a dynamic timing adjustment capability, a latency requirement capability, or a maximum timing adjustment capability. In some aspects, the first communication configuration is a first cyclic prefix size or a first subcarrier spacing and the second communication configuration is a second cyclic prefix size or a second subcarrier spacing.

In some aspects, the second cyclic prefix size or the second subcarrier spacing is configured based at least in part on semi-static signaling or dynamic signaling. In some aspects, the second communication configuration is configured based at least in part on a configuration message received from the other wireless node. In some aspects, the configuration message indicates at least one of a cyclic prefix, subcarrier spacing, modulation and coding scheme, or a frequency domain location that can be supported by the other wireless node for communication on a set of resources.

In some aspects, the second communication configuration is determined based at least in part on an indication of a timing alignment received from the other wireless node. In some aspects, at least one of the first communication configuration or the second communication configuration is a resource specific communication configuration. In some aspects, the wireless node is configured to communicate using a particular slot format, and wherein the particular slot format includes at least one of a downlink symbol-configurable symbol-downlink symbol group within a slot, an uplink symbol-configurable symbol-uplink symbol group within the slot, or an uplink symbol-configurable symbol-downlink symbol group within the slot.

In some aspects, the wireless node is a first wireless node, the other wireless node is a second wireless node, and wherein the first wireless node is configured to communicate with the second wireless node and a third wireless node using space division multiplexing, frequency division multiplexing, code division multiplexing, or time division multiplexing. In some aspects, wherein the wireless node is configured to schedule communication with the other wireless node and the other wireless node is configured to receive scheduling from the wireless node. In some aspects, the wireless node is configured to receive scheduling from the other wireless node and the other wireless node is configured to schedule communication with the wireless node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
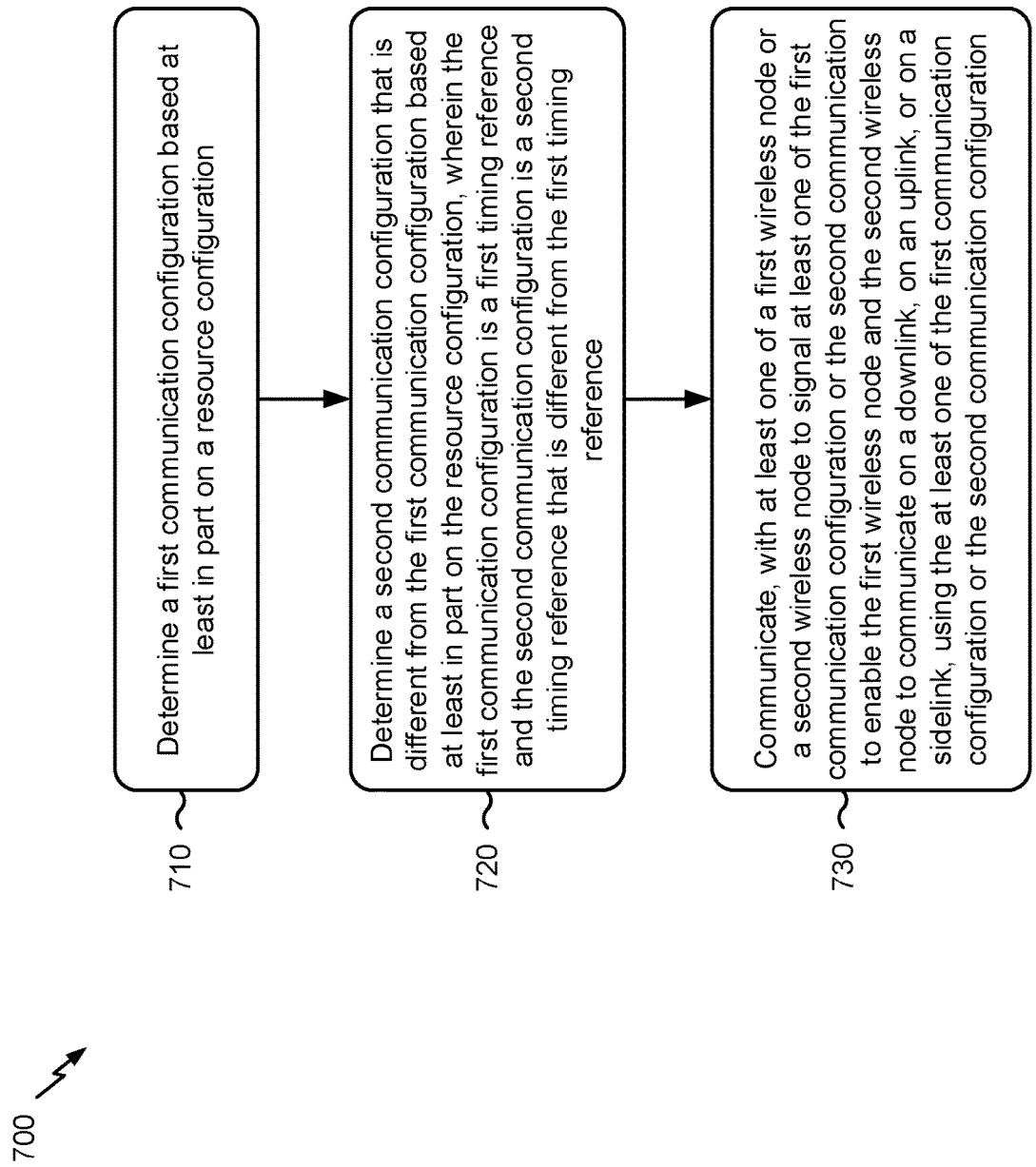
FIG. 7 is a diagram illustrating an example process performed, for example, by a central unit, in accordance with various aspects of the present disclosure.

FIG. 7 is a diagram illustrating an example process 700 performed, for example, by a central unit, in accordance with various aspects of the present disclosure. Example process 700 is an example where a central unit (e.g., BS 110, UE 120, and/or the like) enables concurrent communications in a multi-hop network.

As shown in FIG. 7, in some aspects, process 700 may include determining a first communication configuration based at least in part on a resource configuration (block 710). For example, the central unit (e.g., using controller/processor 240, controller/processor 280, and/or the like) may determine a first communication configuration based at least in part on a resource configuration, as described in more detail above.

As shown in FIG. 7, in some aspects, process 700 may include determining a second communication configuration that is different from the first communication configuration based at least in part on the resource configuration, wherein the first communication configuration is a first timing reference and the second communication configuration is a second timing reference that is different from the first timing reference (block 720). For example, the central unit (e.g., using controller/processor 240, controller/processor 280, and/or the like) may determine a second communication configuration that is different from the first communication configuration based at least in part on the resource configuration, as described in more detail above. In some aspects, the first communication configuration is a first timing reference and the second communication configuration is a second timing reference that is different from the first timing reference.

As shown in FIG. 7, in some aspects, process 700 may include communicating, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration (block 730). For example, the central unit (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate, with at least one of a first wireless node or a second wireless node to signal at least one of the first communication configuration or the second communication to enable the first wireless node and the second wireless node to communicate on a downlink, on an uplink, or on a sidelink, using the at least one of the first communication configuration or the second communication configuration, as described in more detail above.

Process 700 may include additional aspects, such as any single aspect and/or any combination of aspects described below and/or in connection with one or more other processes described elsewhere herein.

In some aspects, the central unit may receive a report regarding one or more characteristics of a network, wherein the first communication configuration and the second communication configuration are determined based at least in part on the one or more characteristics of the network. In some aspects, the central unit may determine the resource configuration based at least in part on one or more characteristics of a network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
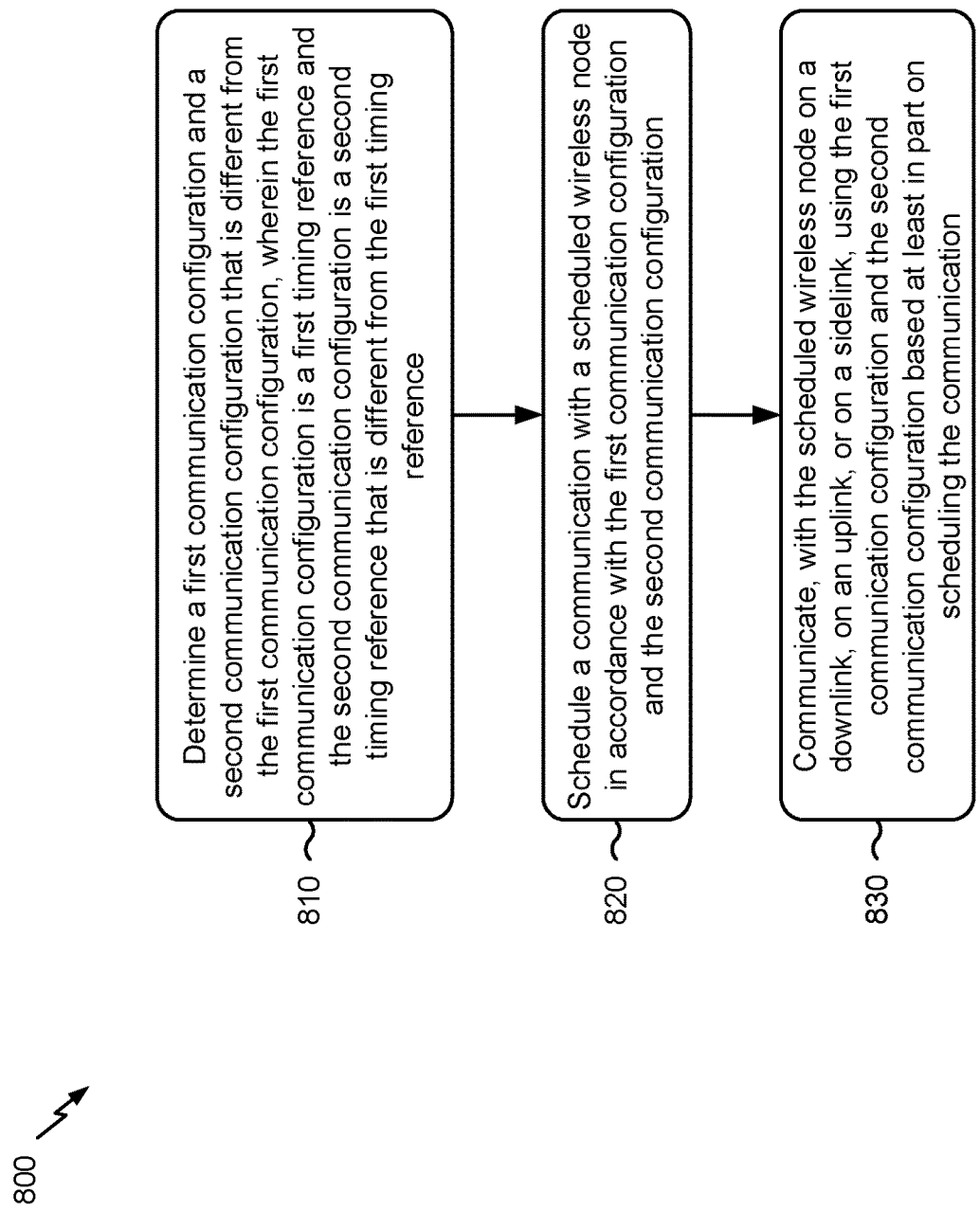
FIG. 8 is a diagram illustrating an example process performed, for example, by a scheduling wireless node, in accordance with various aspects of the present disclosure.

FIG. 8 is a diagram illustrating an example process 800 performed, for example, by a scheduling wireless node, in accordance with various aspects of the present disclosure. Example process 800 is an example where a scheduling wireless node (e.g., BS 110, UE 120, and/or the like) enables concurrent communications in a multi-hop network.

As shown in FIG. 8, in some aspects, process 800 may include determining a first communication configuration and a second communication configuration that is different from the first communication configuration (block 810). For example, the scheduling wireless node, wherein the first communication configuration is a first timing reference and the second communication configuration is a second timing reference that is different from the first timing reference (e.g., using controller/processor 240, controller/processor 280, and/or the like) may determine a first communication configuration and a second communication configuration that is different from the first communication configuration, as described in more detail above. In some aspects, the first communication configuration is a first timing reference and the second communication configuration is a second timing reference that is different from the first timing reference.

As shown in FIG. 8, in some aspects, process 800 may include scheduling a communication with a scheduled wireless node in accordance with the first communication configuration and the second communication configuration (block 820). For example, the scheduling wireless node (e.g., using controller/processor 240, controller/processor 280, and/or the like) may schedule a communication with a scheduled wireless node in accordance with the first communication configuration and the second communication configuration, as described in more detail above.

As shown in FIG. 8, in some aspects, process 800 may include communicating, with the scheduled wireless node on a downlink, on an uplink, or on a sidelink, using the first communication configuration and the second communication configuration based at least in part on scheduling the communication (block 830). For example, the scheduling wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate, with the scheduled wireless node on a downlink, on an uplink, or on a sidelink, using the first communication configuration and the second communication configuration based at least in part on scheduling the communication, as described in more detail above.

Process 800 may include additional aspects, such as any single aspect and/or any combination of aspects described below and/or in connection with one or more other processes described elsewhere herein.

In some aspects, the scheduling wireless node is configured to communicate with the scheduled wireless node using the first communication configuration on one of the downlink, the uplink, or the sidelink, and the scheduling wireless node is configured to communicate with the scheduled wireless node using the second communication configuration on the one of the downlink, the uplink, or the sidelink. In some aspects, the scheduled wireless node is a plurality of scheduled wireless nodes, and the scheduling wireless node is configured to communicate with a first scheduled wireless node, of the plurality of scheduled wireless nodes, using the first communication configuration, and the scheduling wireless node is configured to communicate with a second scheduled wireless node, of the plurality of scheduled wireless nodes, using the second communication configuration.

In some aspects, the scheduling wireless node is configured to receive information identifying at least one of the first communication configuration or the second communication configuration from a central unit of a network. In some aspects, the scheduling wireless node may determine the first communication configuration and the second communication configuration based at least in part on a received report regarding a characteristic of a network. In some aspects, the scheduling wireless node may determine the first communication configuration and the second communication configuration based at least in part on receiving information identifying the first communication configuration and the second communication configuration for the scheduled wireless node. In some aspects, the scheduling wireless node may provide an indication of the first communication configuration and the second communication configuration to the scheduled wireless node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
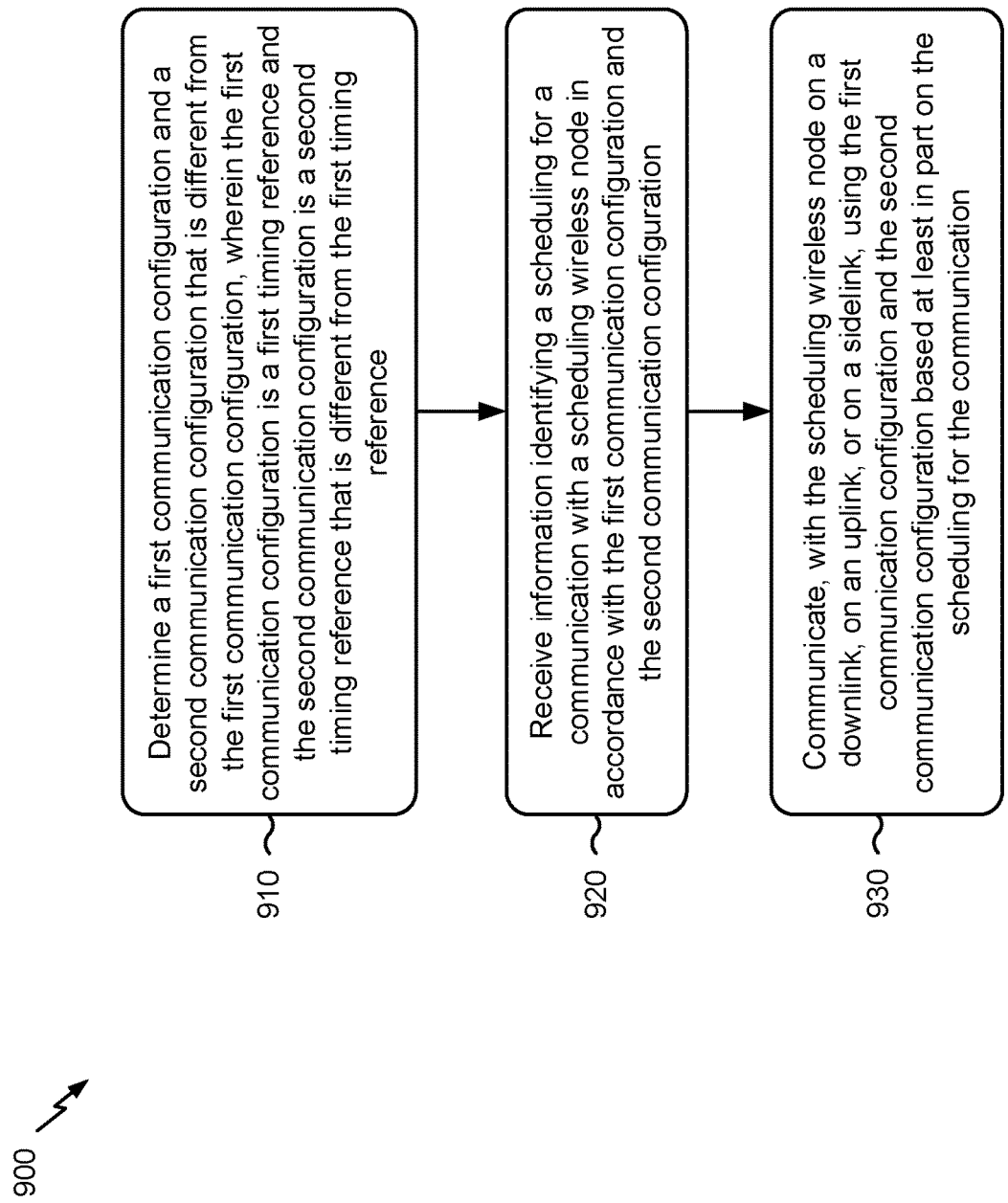
FIG. 9 is a diagram illustrating an example process performed, for example, by a scheduled wireless node, in accordance with various aspects of the present disclosure.

FIG. 9 is a diagram illustrating an example process 900 performed, for example, by a scheduled wireless node, in accordance with various aspects of the present disclosure. Example process 900 is an example where a scheduled wireless node (e.g., BS 110, UE 120, and/or the like) enables concurrent communications in a multi-hop network.

As shown in FIG. 9, in some aspects, process 900 may include determining a first communication configuration and a second communication configuration that is different from the first communication configuration, wherein the first communication configuration is a first timing reference and the second communication configuration is a second timing reference that is different from the first timing reference (block 910). For example, the scheduled wireless node (e.g., using controller/processor 240, controller/processor 280, and/or the like) may determine a first communication configuration and a second communication configuration that is different from the first communication configuration, as described in more detail above. In some aspects, the first communication configuration is a first timing reference and the second communication configuration is a second timing reference that is different from the first timing reference.

As shown in FIG. 9, in some aspects, process 900 may include receiving information identifying a scheduling for a communication with a scheduling wireless node in accordance with the first communication configuration and the second communication configuration (block 920). For example, the scheduled wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive information identifying a scheduling for a communication with a scheduling wireless node in accordance with the first communication configuration and the second communication configuration, as described in more detail above.

As shown in FIG. 9, in some aspects, process 900 may include communicating, with the scheduling wireless node on a downlink, on an uplink, or on a sidelink, using the first communication configuration and the second communication configuration based at least in part on the scheduling for the communication (block 930). For example, the scheduled wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate, with the scheduling wireless node on a downlink, on an uplink, or on a sidelink, using the first communication configuration and the second communication configuration based at least in part on the scheduling for the communication, as described in more detail above.

Process 900 may include additional aspects, such as any single aspect and/or any combination of aspects described below and/or in connection with one or more other processes described elsewhere herein.

In some aspects, the scheduled wireless node is configured to communicate with the scheduling wireless node using the first communication configuration on one of the downlink, the uplink, or the sidelink, and the scheduled wireless node is configured to communicate with the scheduling wireless node using the second communication configuration on the one of the downlink, the uplink, or the sidelink. In some aspects, the scheduled wireless node is configured to receive information identifying at least one of the first communication configuration or the second communication configuration from a central unit of a network or from the scheduling wireless node.

In some aspects, the scheduled wireless node may provide a report identifying a characteristic of a network to the scheduling wireless node or a central unit to enable a determination of the first communication configuration and the second communication configuration. In some aspects, the report identifies a capability of the scheduled wireless node, a candidate communication configuration, or a network measurement. In some aspects, the scheduled wireless node may determine the first communication configuration and the second communication configuration based at least in part on receiving information, from a central unit or the scheduling wireless node, identifying the first communication configuration and the second communication configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
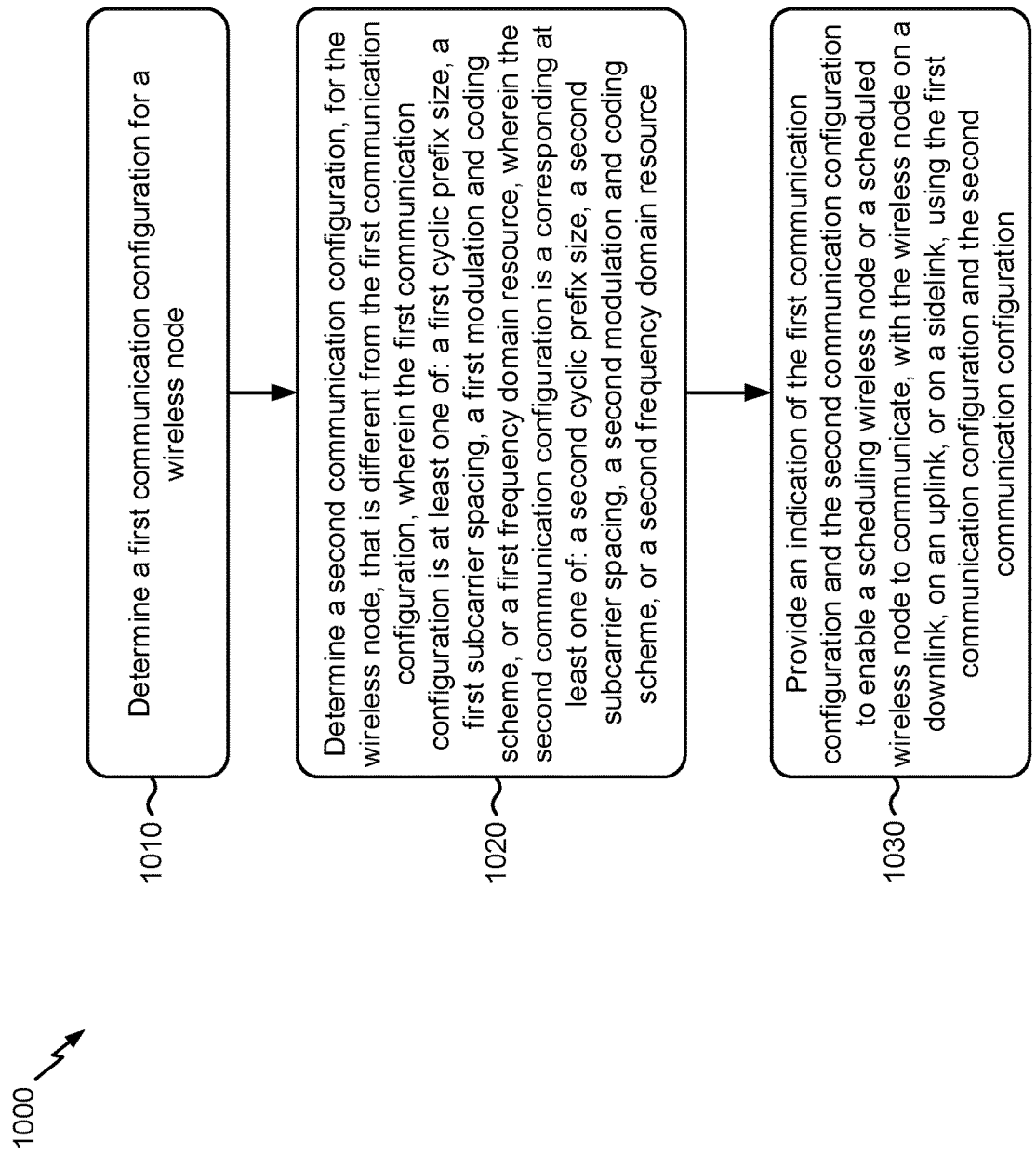
FIG. 10 is a diagram illustrating an example process performed, for example, by a central unit, in accordance with various aspects of the present disclosure.

FIG. 10 is a diagram illustrating an example process 1000 performed, for example, by a central unit, in accordance with various aspects of the present disclosure. Example process 1000 is an example where a central unit (e.g., BS 110, UE 120, and/or the like) enables concurrent communications in a multi-hop network.

As shown in FIG. 10, in some aspects, process 1000 may include determining a first communication configuration for a wireless node (block 1010). For example, the central unit (e.g., using controller/processor 240, controller/processor 280, and/or the like) may determine a first communication configuration for a wireless node, as described in more detail above.

As shown in FIG. 10, in some aspects, process 1000 may include determining a second communication configuration, for the wireless node, that is different from the first communication configuration, wherein the first communication configuration is at least one of: a first cyclic prefix size, a first subcarrier spacing, a first modulation and coding scheme, or a first frequency domain resource, and wherein the second communication configuration is a corresponding at least one of: a second cyclic prefix size, a second subcarrier spacing, a second modulation and coding scheme, or a second frequency domain resource (block 1020). For example, the central unit (e.g., using controller/processor 240, controller/processor 280, and/or the like) may determine a second communication configuration, for the wireless node, that is different from the first communication configuration, as described in more detail above. In some aspects, the first communication configuration is at least one of: a first cyclic prefix size, a first subcarrier spacing, a first modulation and coding scheme, or a first frequency domain resource. In some aspects, the second communication configuration is a corresponding at least one of: a second cyclic prefix size, a second subcarrier spacing, a second modulation and coding scheme, or a second frequency domain resource.

As shown in FIG. 10, in some aspects, process 1000 may include providing an indication of the first communication configuration and the second communication configuration to enable a scheduling wireless node or a scheduled wireless node to communicate, with the wireless node on a downlink, on an uplink, or on a sidelink, using the first communication configuration and the second communication configuration (block 1030). For example, the central unit (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may provide an indication of the first communication configuration and the second communication configuration to enable a scheduling wireless node or a scheduled wireless node to communicate, with the wireless node on a downlink, on an uplink, or on a sidelink, using the first communication configuration and the second communication configuration, as described in more detail above.

Process 1000 may include additional aspects, such as any single aspect and/or any combination of aspects described below and/or in connection with one or more other processes described elsewhere herein.

In some aspects, the central unit is configured to determine the first communication configuration and the second communication configuration based at least in part on a report from the scheduled wireless node or the scheduling wireless node. In some aspects, the central unit is configured based at least in part on semi-static signaling or dynamic signaling. In some aspects, the central unit is configured to receive a configuration message indicating at least one of a cyclic prefix, a subcarrier spacing, a modulation and coding scheme, or a frequency domain location that can be supported by the scheduled wireless node or the scheduling wireless node for communication on a set of resources, wherein the first communication configuration and the second communication configuration are determined based at least in part on the configuration message. In some aspects, the second communication configuration is determined based at least in part on an indication of a timing alignment received from the scheduled wireless node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
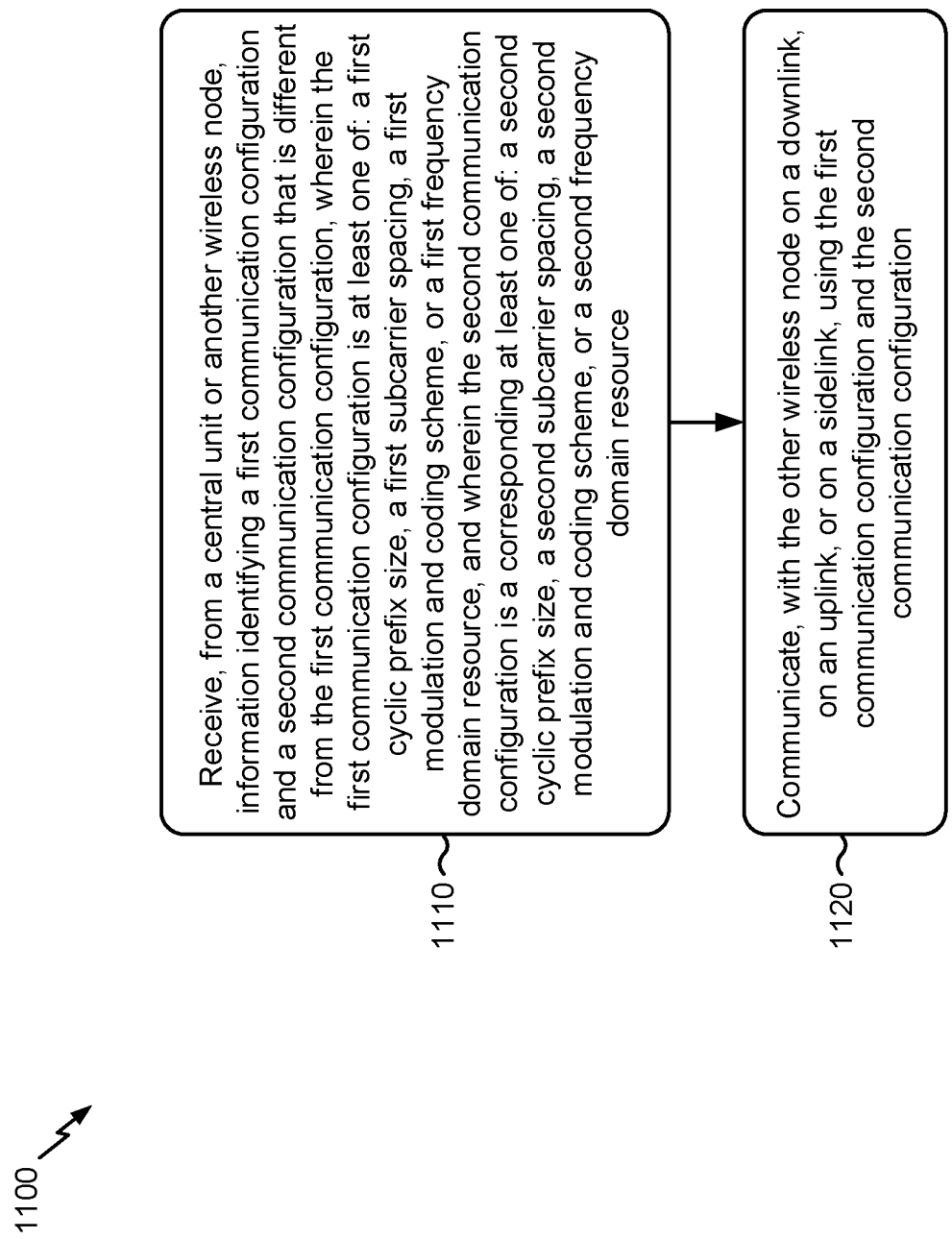
FIG. 11 is a diagram illustrating an example process performed, for example, by a wireless node, in accordance with various aspects of the present disclosure.

FIG. 11 is a diagram illustrating an example process 1100 performed, for example, by a wireless node, in accordance with various aspects of the present disclosure. Example process 1100 is an example where a wireless node (e.g., BS 110, UE 120, and/or the like) enables concurrent communications in a multi-hop network. In some aspects, the wireless node is a scheduling wireless node or a scheduled wireless node.

As shown in FIG. 11, in some aspects, process 1100 may include receiving, from a central unit or another wireless node, information identifying a first communication configuration and a second communication configuration that is different from the first communication configuration, wherein the first communication configuration is at least one of: a first cyclic prefix size, a first subcarrier spacing, a first modulation and coding scheme, or a first frequency domain resource, and wherein the second communication configuration is a corresponding at least one of: a second cyclic prefix size, a second subcarrier spacing, a second modulation and coding scheme, or a second frequency domain resource (block 1110). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from a central unit or another wireless node, information identifying a first communication configuration and a second communication configuration that is different from the first communication configuration, as described in more detail above. In some aspects, the first communication configuration is at least one of: a first cyclic prefix size, a first subcarrier spacing, a first modulation and coding scheme, or a first frequency domain resource. In some aspects, the second communication configuration is a corresponding at least one of: a second cyclic prefix size, a second subcarrier spacing, a second modulation and coding scheme, or a second frequency domain resource.

As shown in FIG. 11, in some aspects, process 1100 may include communicating, with the other wireless node on a downlink, on an uplink, or on a sidelink, using the first communication configuration and the second communication configuration (block 1120). For example, the wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate, with the other wireless node on a downlink, on an uplink, or on a sidelink, using the first communication configuration and the second communication configuration, as described in more detail above.

Process 1100 may include additional aspects, such as any single aspect and/or any combination of aspects described in connection with one or more other processes described elsewhere herein.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
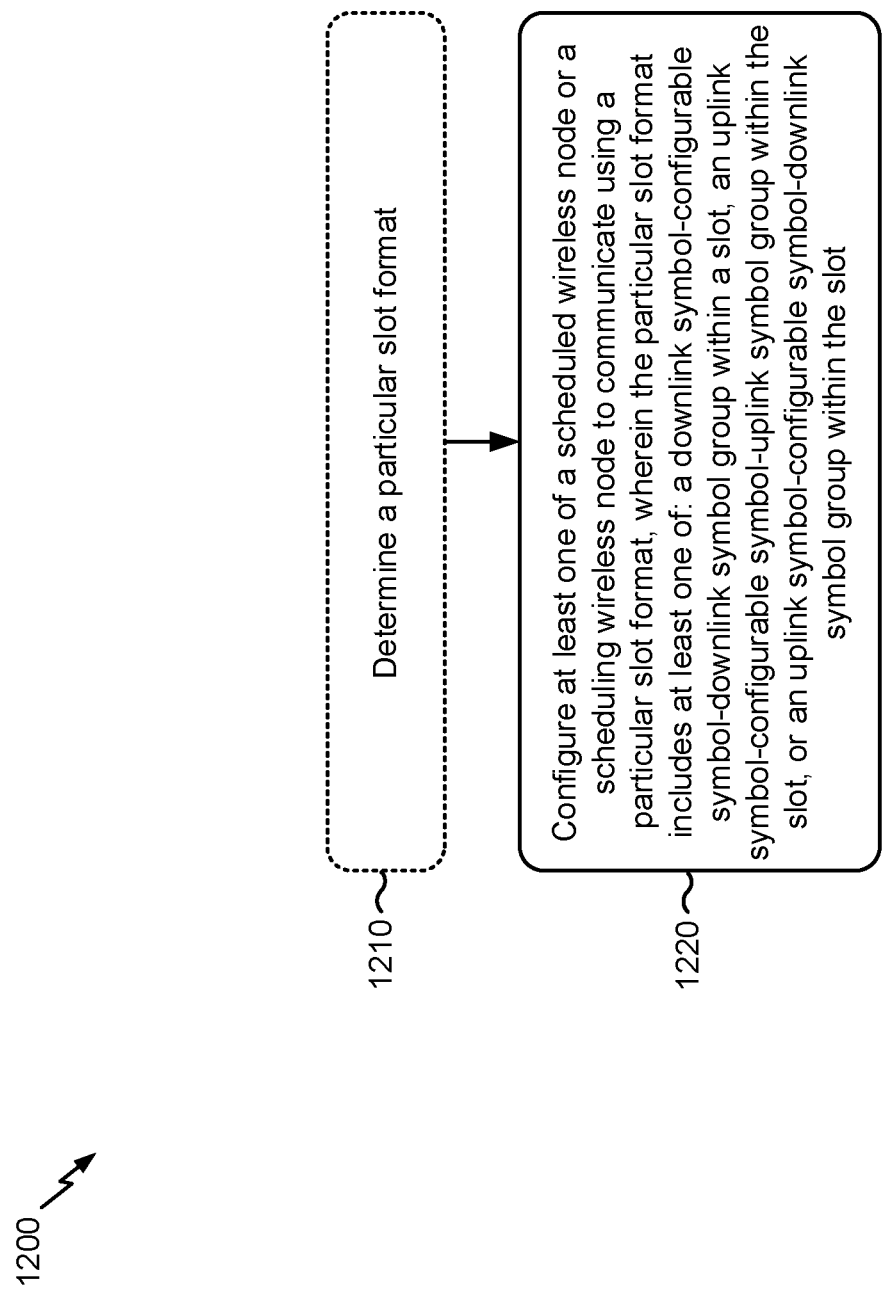
FIG. 12 is a diagram illustrating an example process performed, for example, by a central unit, in accordance with various aspects of the present disclosure.

FIG. 12 is a diagram illustrating an example process 1200 performed, for example, by a central unit, in accordance with various aspects of the present disclosure. Example process 1200 is an example where a central unit (e.g., BS 110, UE 120, and/or the like) enables concurrent communications in a multi-hop network.

As shown in FIG. 12, in some aspects, process 1200 may include determining a particular slot format (block 1210). For example, the central unit (e.g., using controller/processor 240, controller/processor 280, and/or the like) may determine a particular slot format, as described in more detail above.

As shown in FIG. 12, in some aspects, process 1200 may include configuring at least one of a scheduled wireless node or a scheduling wireless node to communicate using a particular slot format, wherein the particular slot format includes at least one of: a downlink symbol-configurable symbol-downlink symbol group within a slot, an uplink symbol-configurable symbol-uplink symbol group within the slot, or an uplink symbol-configurable symbol-downlink symbol group within the slot (block 1220). For example, the central unit (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may configure at least one of a scheduled wireless node or a scheduling wireless node to communicate using a particular slot format, as described in more detail above. In some aspects, the particular slot format includes at least one of: a downlink symbol-configurable symbol-downlink symbol group within a slot, an uplink symbol-configurable symbol-uplink symbol group within the slot, or an uplink symbol-configurable symbol-downlink symbol group within the slot.

Process 1200 may include additional aspects, such as any single aspect and/or any combination of aspects described in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
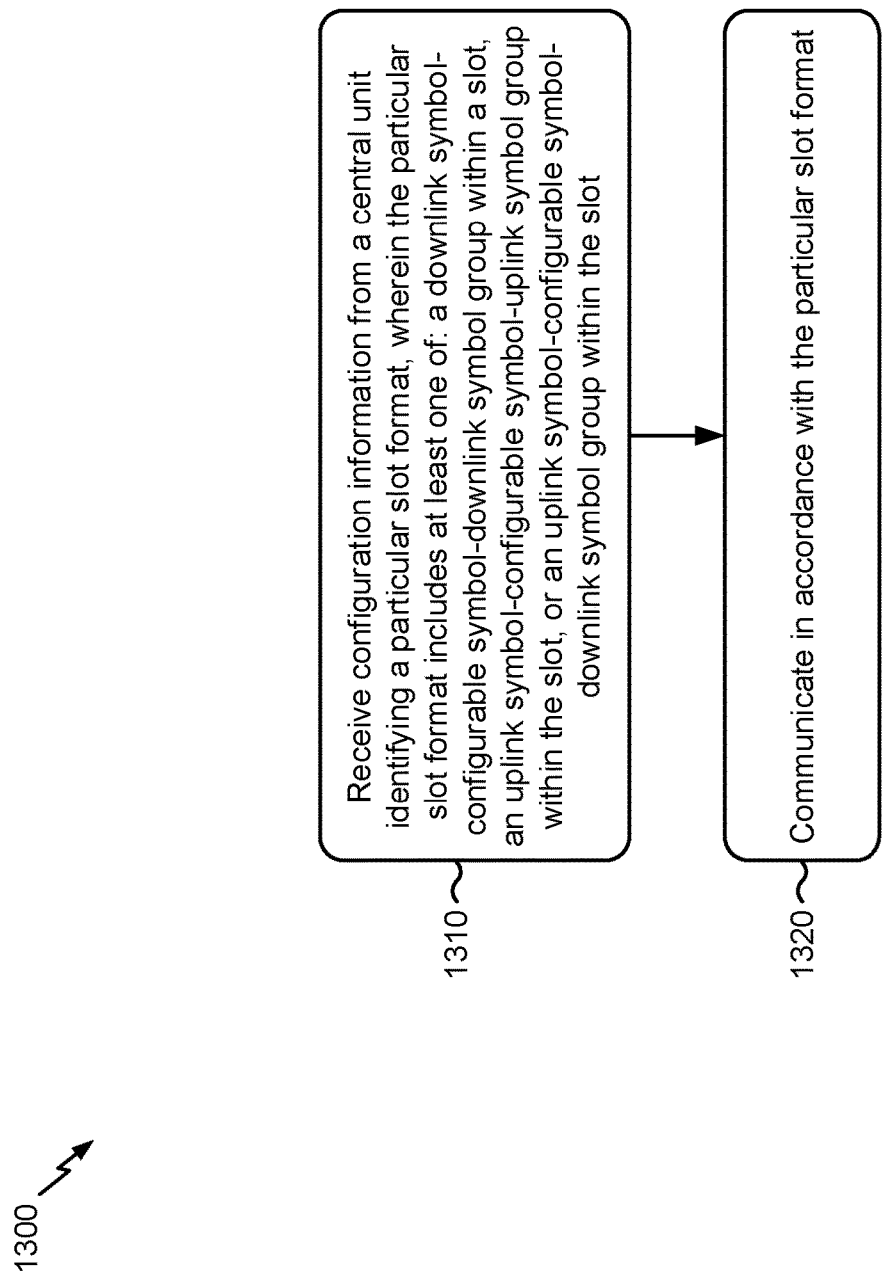
FIG. 13 is a diagram illustrating an example process performed, for example, by a wireless node, in accordance with various aspects of the present disclosure.

FIG. 13 is a diagram illustrating an example process 1300 performed, for example, by a wireless node, in accordance with various aspects of the present disclosure. Example process 1300 is an example where a wireless node (e.g., BS 110, UE 120, and/or the like) enables concurrent communications in a multi-hop network. In some aspects, the wireless node is a scheduling wireless node or a scheduled wireless node.

As shown in FIG. 13, in some aspects, process 1300 may include receiving configuration information from a central unit identifying a particular slot format, wherein the particular slot format includes at least one of: a downlink symbol-configurable symbol-downlink symbol group within a slot, an uplink symbol-configurable symbol-uplink symbol group within the slot, or an uplink symbol-configurable symbol-downlink symbol group within the slot (block 1310). For example, the wireless node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive configuration information from a central unit identifying a particular slot format, as described in more detail above. In some aspects, the particular slot format includes at least one of: a downlink symbol-configurable symbol-downlink symbol group within a slot, an uplink symbol-configurable symbol-uplink symbol group within the slot, or an uplink symbol-configurable symbol-downlink symbol group within the slot.

As shown in FIG. 13, in some aspects, process 1300 may include communicating in accordance with the particular slot format (block 1320). For example, the wireless node (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may communicate in accordance with the particular slot format, as described in more detail above.

Process 1300 may include additional aspects, such as any single aspect and/or any combination of aspects described herein in connection with one or more other processes described elsewhere herein.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A wireless node for wireless communication, comprising:
   one or more memories; and
   one or more processors coupled to the one or more memories, the one or more processors individually or collectively configured to:
     receive configuration information identifying a slot format,
       wherein the slot format comprises an indication of a group of symbols within a slot, the group of symbols comprising one or more uplink symbols (U), one or more flexible symbols (F), and one or more downlink symbols (D) within the slot; and
     communicate using the slot format.

2. The wireless node of claim 1, wherein the configuration information is first configuration information and the slot format is a first slot format; and
   wherein the one or more processors are further configured to:
     receive second configuration information identifying a second slot format,
       wherein the second slot format includes a downlink symbol (D)-flexible symbol (F)-downlink symbol (D) group; and
     communicate using the second slot format.

3. The wireless node of claim 1, wherein the configuration information is first configuration information and the slot format is a first slot format; and
   wherein the one or more processors are further configured to:
     receive second configuration information identifying a second slot format,
       wherein the second slot format includes an uplink symbol (U)-flexible symbol (F)-uplink symbol (U) group; and
     communicate using the second slot format.

4. The wireless node of claim 1, wherein the slot format supports dynamic configuration adjustment.

5. The wireless node of claim 1, wherein the wireless node is a scheduling wireless node or a scheduled wireless node.

6. The wireless node of claim 1, wherein the configuration information is received from a network device.

7. The wireless node of claim 1, wherein the wireless node is an integrated access/backhaul (IAB) node.

8. A network device for wireless communication, comprising:
   one or more memories; and
   one or more processors coupled to the one or more memories, the one or more processors individually or collectively configured to:
     determine a slot format for communication,
       wherein the slot format comprises an indication of a set of symbols within a slot, the set of symbols comprising one or more uplink symbols, one or more flexible symbols, and one or more downlink symbols within the slot; and
     configure a wireless node to communicate using the slot format.

9. The network device of claim 8, wherein the one or more processors, to configure the wireless node, are configured to:
   configure at least one of a scheduled wireless node or a scheduling wireless node.

10. The network device of claim 8, wherein the slot format is a first slot format and the wireless node is a first wireless node; and
    wherein the one or more processors are further configured to:
      determine a second slot format for configuration,
        wherein the second slot format includes a downlink symbol-flexible symbol-downlink symbol group; and
      configure a second wireless node to communicate using the second slot format.

11. The network device of claim 8, wherein the slot format is a first slot format and the wireless node is a first wireless node; and
    wherein the one or more processors are further configured to:
      determine a second slot format for configuration,
        wherein the second slot format includes an uplink symbol-flexible symbol-uplink symbol group; and
      configure a second wireless node to communicate using the second slot format.

12. The network device of claim 8, wherein the slot format supports dynamic configuration adjustment.

13. The network device of claim 8, wherein the one or more processors are further configured to:
    receive configuration information from a central unit; and
    wherein the one or more processors, to configure the wireless node, are configured to:
      configure the wireless node based at least in part on the configuration information.

14. The network device of claim 8, wherein the network device is a central unit.

15. A method of wireless communication performed by a wireless node, comprising:

receiving configuration information identifying a slot format,
  wherein the slot format comprises an indication of a group of symbols within one or more slots, the group of symbols comprising one or more uplink symbols, one or more flexible symbols, and one or more downlink symbols within the slot; and communicating using the slot format.

16. The method of claim 15, wherein the configuration information is first configuration information and the slot format is a first slot format; and
  wherein the method further comprises:
    receiving second configuration information identifying a second slot format,
      wherein the second slot format includes a downlink symbol-flexible symbol-downlink symbol group; and
    communicating using the second slot format.

17. The method of claim 15, wherein the configuration information is first configuration information and the slot format is a first slot format; and
  wherein the method further comprises:
    receiving second configuration information identifying a second slot format,
      wherein the second slot format includes an uplink symbol-flexible symbol-uplink symbol group; and
    communicating using the second slot format.

18. The method of claim 15, wherein the slot format supports dynamic configuration adjustment.

19. The method of claim 15, wherein the wireless node is a scheduling wireless node or a scheduled wireless node.

20. The method of claim 15, wherein the configuration information is received from a network device.

21. The method of claim 15, wherein the wireless node is an integrated access/backhaul (IAB) node.

22. A method of wireless communication performed by a network device, comprising:
  determining a slot format for communication,
    wherein the slot format comprises an indication of a set of symbols within a slot, the set of symbols comprising one or more uplink symbols, one or more flexible symbols and one or more downlink symbols within the slot; and configuring a wireless node to communicate using the slot format.

23. The method of claim 22, wherein configuring the wireless node comprises:
  configuring at least one of a scheduled wireless node or a scheduling wireless node.

24. The method of claim 22, wherein the slot format is a first slot format and the wireless node is a first wireless node; and
  wherein the method further comprises:
    determining a second slot format for configuration,
      wherein the second slot format includes a downlink symbol-flexible symbol-downlink symbol group; and
    configuring a second wireless node to communicate using the second slot format.

25. The method of claim 22, wherein the slot format is a first slot format and the wireless node is a first wireless node; and
  wherein the method further comprises:
    determining a second slot format for configuration,
      wherein the second slot format includes an uplink symbol-flexible symbol-uplink symbol group; and
    configuring a second wireless node to communicate using the second slot format.

26. The method of claim 22, wherein the slot format supports dynamic configuration adjustment.

27. The method of claim 22, further comprising:
  receiving configuration information from a central unit; and
  wherein configuring the wireless node comprises:
    configuring the wireless node based at least in part on the configuration information.

28. The method of claim 22, wherein the network device is a central unit.

29. The wireless node of claim 6, wherein the network device is a central unit.

30. The method of claim 20, wherein the network device is a central unit.

* * * * *